US007908593B2

(12) United States Patent
Arnold et al.

(10) Patent No.: US 7,908,593 B2
(45) Date of Patent: Mar. 15, 2011

(54) TECHNIQUE FOR EVALUATING SOFTWARE PERFORMANCE ONLINE TO SUPPORT ONLINE TUNING

(75) Inventors: Matthew R. Arnold, Ossining, NY (US); Michael J. Hind, Cortlandt Manor, NY (US); Jeremy Lau, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 11/650,111

(22) Filed: Jan. 4, 2007

(65) Prior Publication Data

US 2008/0168433 A1     Jul. 10, 2008

(51) Int. Cl.
*G06F 9/44* (2006.01)
(52) U.S. Cl. .................... 717/131; 717/154
(58) Field of Classification Search .............. 717/131, 717/154
See application file for complete search history.

(56) References Cited

U.S. PATENT DOCUMENTS

| | | | | |
|---|---|---|---|---|
| 5,819,094 | A * | 10/1998 | Sato et al. | 717/131 |
| 6,163,840 | A * | 12/2000 | Chrysos et al. | 712/227 |
| 6,202,199 | B1 * | 3/2001 | Wygodny et al. | 717/125 |
| 6,286,130 | B1 * | 9/2001 | Poulsen et al. | 717/119 |
| 6,467,052 | B1 * | 10/2002 | Kaler et al. | 714/39 |
| 6,473,897 | B1 * | 10/2002 | Ansari et al. | 717/136 |
| 7,143,008 | B2 * | 11/2006 | Ochi et al. | 702/186 |
| 7,380,172 | B2 * | 5/2008 | Srinivas et al. | 714/38 |

OTHER PUBLICATIONS

M.J. Voss and R. Eigemann, "High-Level Adaptive Program Optimization with ADAPT," ACM SIGPLAN Notices, 36(7):93-102, Jul. 2001.
Furstin, et al., "A Practical Method for quickly evaluating program optimizations" in Proceedings of the 1st International Conference on High Performance Embedded Architectures & Compilers (HiPEAC 2005), number 3793 in LNCS, pp. 29-46. Springer Verlag, Nov. 2005).
P.C. Diniz and M.C. Rinard, "Dynamic feedback: An effective technique for adapting computing," ACM SIGPLAN Notices, 32(5):71-84, May 1997 in Conference on Programming Language Design and Implementation (PLDI).
D. Maier, P. Ramarao, M. Stoodley and V. Sundarsean, "Experiences with Multithreading and Dynamic Class Loading in a Java just-in-time compiler," The International Symposium on Code Generation and Optimization, Mar. 2006.
M. Arnold and B.G. Ryder, "A framework for reducing the cost of instrumented code," ACM SIGPLAN Notices, 36(5)168-179, May 2001.

* cited by examiner

*Primary Examiner* — Wei Y Zhen
*Assistant Examiner* — Phillip H Nguyen
(74) *Attorney, Agent, or Firm* — Michael J. Buchenhorner; Vazken Alexanian

(57) ABSTRACT

A method for evaluating software performance includes steps of: receiving a plurality of versions of code; selecting starting and stopping points for timing execution of the code versions; dispatching at least two of the plurality of code versions for execution; repeatedly executing the at least two code versions; recording execution times for the at least two code versions, according to the selected starting and stopping points; collecting the execution times; and processing the collected execution times. The method further includes steps of: performing a statistical analysis of the collected execution times for determining which code version is fastest; and invoking a confidence metric periodically to determine if a difference between means is statistically meaningful.

16 Claims, 4 Drawing Sheets

TECHNIQUE FOR EVALUATING SOFTWARE PERFORMANCE ONLINE TO SUPPORT ONLINE TUNING

STATEMENT REGARDING FEDERALLY SPONSORED-RESEARCH OR DEVELOPMENT

This invention was made with government funding support under United States Government Contract NBCH3039004, awarded by the Defense Research Projects Agency (DARPA). The Government has certain rights in this invention.

CROSS-REFERENCE TO RELATED APPLICATIONS

Not Applicable.

FIELD OF THE INVENTION

The invention disclosed broadly relates to the field of information processing systems, and more particularly relates to the field of tuning software performance parameters.

BACKGROUND OF THE INVENTION

The goal of compiler optimization is to improve program performance. Ideally, an optimization improves performance for all programs, but some optimizations can also degrade performance for some programs. Thus, it is sometimes acceptable for an optimization to improve performance on average over a set of programs, even if a small performance degradation is seen for some of these programs.

This often leads to aggressive optimizations, which can produce substantial performance gains and degradations, turned off by default in production compilers because it is difficult to know when to choose these optimizations, and the penalty for a wrong decision is high.

Therefore, developing a compiler involves tuning a number of heuristics to find values that achieve good performance on average, without significant performance degradations. Today's virtual machines (VMs) perform sophisticated online feedback-directed optimizations, where profile information is gathered during the execution of the program and immediately used during the same run to bias optimization decisions toward frequently executing sections of the program. For example, many VMs capture basic block counts during the initial executions of a method and later use this information to bias optimizations such as code layout, register allocation, inlining, method splitting, and alignment of branch targets. Although these techniques are widely used in today's high performance VMs, their speculative nature further increases the possibility that an optimization may degrade performance if the profile data is incorrect or if the program behavior changes during execution.

The empirical search community takes a different approach toward optimization. Rather than tuning the compiler to find the best "compromise setting" to be used for all programs, they acknowledge that it is unlikely any such setting exists. Instead, the performance of various optimization settings, such as loop unroll factor, are measured on a particular program, input, and environment, with the goal of finding the best optimization strategy for that program and environment. This approach has been very successful, especially for numerical applications. Architectures and environments vary greatly, especially for Java programs, and tuning a program's optimizations to its running environment is critical for high performance.

The majority of the empirical search has been performed offline. With the rich runtime environment provided by a VM, it becomes possible to perform fully automatic empirical search online as a program executes. Such a system could compile multiple versions of each method, compare their performance, and select the winner. Examples of such an online system are the Dynamic Feedback and ADAPT (M. J. Voss and R. Eigemann, "High-level Adaptive Program Optimization with ADAPT. *ACM SIGPLAN Notices*, 36(7):93-102, July 2001) systems, and the work by Fursin et al. (see G. Fursin, A. Cohen, M. O'Boyle, and O. Temam, "A practical method for quickly evaluating program optimizations" in *Proceedings of the 1st International Conference on High Performance Embedded Architectures & Compilers* (HiPEAC 2005), number 3793 in LNCS, pages 29-46. Springer Verlag, November 2005).

The most significant challenge to such an approach is that an online system does not have the ability to run the program (or method) multiple times with the exact same program state. Traditional empirical search, and optimization evaluation in general, is performed by holding as many variables constant as possible, including: 1) the program, 2) the program's inputs, and 3) the underlying environment (operating system, architecture, memory, and so on). In an online system, the program state is continually changing; each invocation of a method may have different parameter values and different global program states. Without the ability to re-execute each optimized version of the method with the exact same parameters and program state, meaningful performance comparisons seem impossible. Current online systems do not provide a solution for general optimizations to address the issue of changing inputs or workload. See P. C. Diniz and M. C. Rinard, "Dynamic feedback: An effective technique for adapting computing," *ACM SIGPLAN Notices*, 32(5):71-84, May 1997 in *Conference on Programming Language Design and Implementation (PLDI)*. See also G. Fursin, A. Cohen, M. O'Boyle, and O. Temam, "A practical method for quickly evaluating program optimizations," in *Proceedings of the 1st International Conference on High Performance Embedded Architectures & Compilers* (HiPEAC 2005), number 3793 in LNCS, pages 29-46, Springer Verlag, November 2005; and M. J. Voss and R. Eigemann, "High-level adaptive program optimization with ADAPT," *ACM SIGPLAN Notices*, 36(7): 93-102, July 2001.

Compilers, virtual machines, applications servers, software libraries, and software systems in general often have a number of "tuning knobs," or parameterized values that can be adjusted or "tuned" to improve performance. In compilers, examples include loop unrolling depth and method inlining heuristics. In application servers, examples include thread pool sizes and max network connections. Often it is difficult to identify the optimal value for these knobs, and the best value can vary depending on a number of factors, such as the hardware, operating system (OS), VM, workload on the machine, benchmark, or benchmark input. All high-performance VMs use a selective optimization strategy, where methods are initially executed using an interpreter or a non-optimizing compiler. A coarse-grained profiling mechanism, such as method counters or timer-based call-stack sampling, is used to find the JIT compiler.

VMs use the JIT compiler's multiple optimization levels to tradeoff the cost of high-level optimizations with their benefit; when a method continues to consume cycles, higher levels of optimization are employed. Some VMs, like J9, will compile the hottest methods twice: once to insert instrumentation to gather detailed profile information about the method, and then a second time to take advantage of the profile information after the method has run for some duration. Thus, in modern VMs a particular method may be compiled many times (with different optimization strategies) during a program's execution. Overhead is kept low by performing such compilations on only a small subset of the executing methods, and often by compiling concurrently using a background compilation thread.

Even in cases where there is a single best value for a given environment, it may never be discovered because so many of these knobs exist and they require developer effort to perform the offline tuning. Even in production systems these knobs are often set using a "best guess," or minimally tuned value and there is generally little time or incentive for a developer to expend effort in searching for a best case.

It would be ideal to tune these knobs at run time, but this approach has a number of challenges. The optimization could be tried with multiple tuning values, and the highest performing version could be selected. However, the biggest problem with this approach is that, unlike in offline tuning, the program cannot be stopped and restarted to execute the same code multiple times with the same input for comparing performance. The online system continues executing new code, thus making performance comparisons of two versions difficult.

One approach would be to "sandbox" the execution. Sandboxing refers to taking a snapshot of the program state, and re-executing a particular program path multiple times to evaluate the impact of different tuning knobs, or different optimization decisions. However, this is difficult to engineer because executing the code changes the program state; one cannot always execute code repeatedly without having unacceptable side effects. In addition, executing in a sandbox may skew the performance, even if just slightly, making it hard to predict subtle performance anomalies. Therefore, there is a need for a method and system that overcomes the above shortcomings of the prior art.

SUMMARY OF THE INVENTION

Briefly, according to an embodiment of the invention, a method for evaluating software performance includes steps or acts of: receiving a plurality of versions of code; selecting starting and stopping points for timing execution of the code versions; dispatching at least two of the plurality of code versions for execution; repeatedly executing the at least two code versions; recording execution times for the at least two code versions, according to the selected starting and stopping points; collecting the execution times; and processing the collected execution times.

The method further includes steps of: performing a statistical analysis of the collected execution times for determining which code version is fastest; and invoking a confidence metric periodically to determine if a difference between means is statistically meaningful.

A system according to the present invention includes a processor configured for carrying out the above method steps; a memory for storing each execution time; an input/output interface for communicating results to a user of the system; counters for tracking iterations of the code; and timers for timing the execution of the code.

A computer readable medium includes program instructions for executing the method steps as discussed above.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
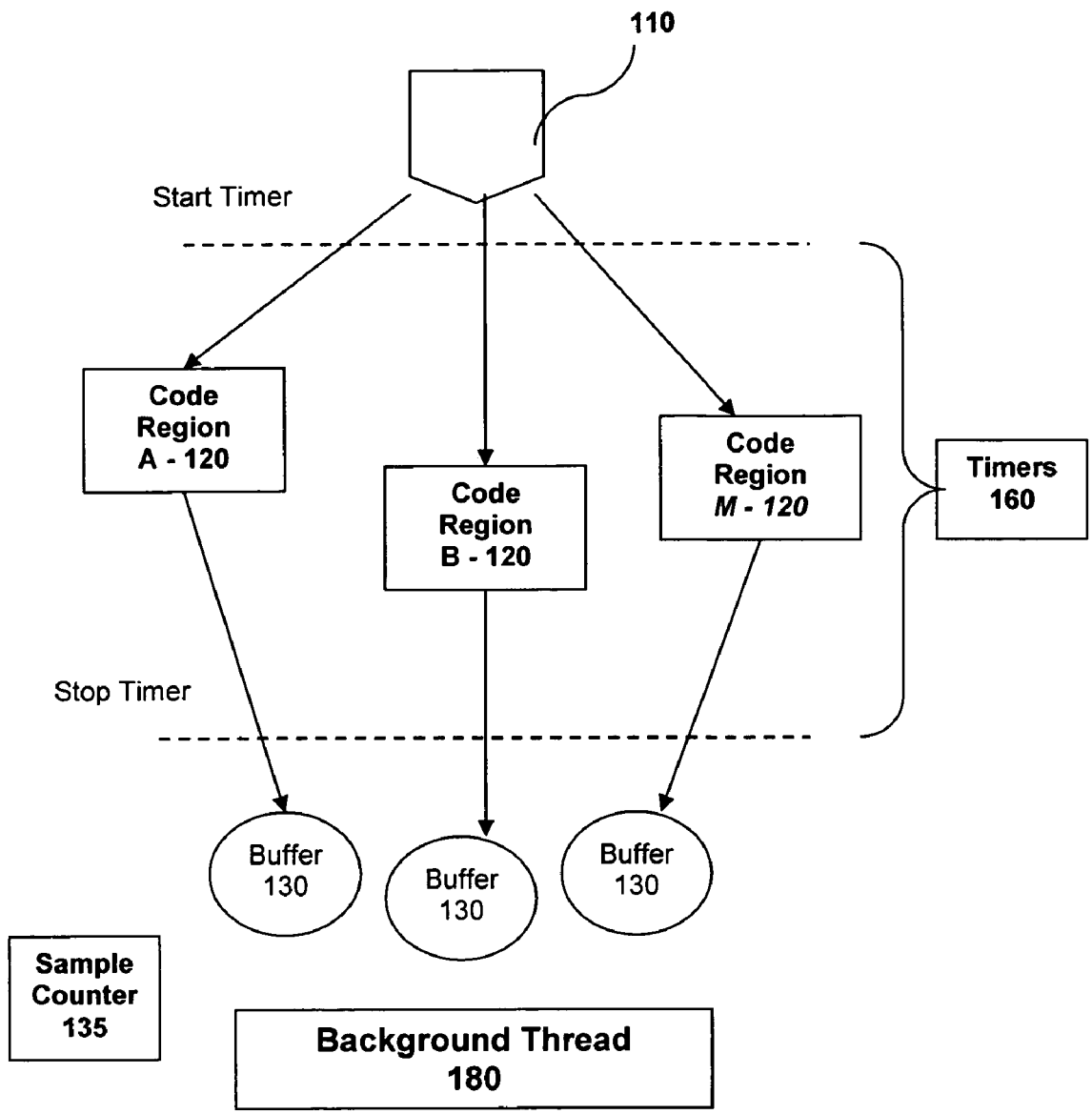
FIG. 1 is a simplified diagram of an online system for evaluating code optimizations, according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We discuss a system and method for comparing the performance of multiple versions of a region of code without attempting to hold inputs and program state constant. This method provides a framework for a low overhead automatic online system that evaluates the effectiveness of optimizations, dealing with changing program states and/or input. The framework tracks the bottom-line performance of multiple implementations of a region of code to determine which one is fastest. The analysis can be performed online: as the application executes, performance evaluations are executed and the results are immediately available. No offline training runs or hardware support are required.

The framework may use method boundaries to delimit code regions (as is common in virtual machines); or alternatively, code path boundaries could be used as delimeters. For purposes of this discussion we limit our examples to comparing only two versions of each method at a time; however, the ideas presented are not limited to these design choices. The following discussion focuses on virtual machines (VMs); however, a method according to an embodiment of the present invention can be applied to compilers, application servers, software libraries, and software systems in general.

We will discuss online tuning in a VM, assuming that there are at least two versions of the code being evaluated, and that optimization is performed at a method level. However, these approaches could be applied in other scenarios and for any number of versions.

Using this mechanism to compare two methods the VM can perform online performance comparisons. This mechanism can be used by the online adaptive system in different ways. For example, the system can:

1) Detect performance anomalies among the compilation levels. Most compilers have multiple optimization levels (e.g., O1, O2). In most cases the higher levels outperform the lower levels, but in some cases they actually degrade performance. This situation can be detected online, and the method can be demoted to the lower, higher-performing level.

2) Online performance tuning. Given a particular tuning knob, the values of that knob can be explored, or tuned, at runtime to find a setting that achieves optimal performance. This can allow the VM to achieve a level of performance not possible with purely offline tuning.

As mentioned above, all of the above techniques can be applied in contexts other than virtual machines, such as application servers, software libraries, and software components in general.

We refer to the process of identifying the faster method variant as a performance contest. The component that requests and uses the contest results is called the client. The client may be an entity or software. The framework client 1) provides the alternative optimized implementations of the code region to be compared; and 2) determines what action to take with the outcome of the contest. One example client may employ the framework to evaluate aggressive optimizations that significantly improve performance for some code regions, but degrade performance for others. Using the framework, the performance degradations can be identified and the code can revert to its original implementation.

Another example client may wish to employ the framework to empirically search the tuning space for important optimization parameters and choose the parameter that gives the best performance.

According to an embodiment of the present invention, the framework has two major components: 1) a technique to collect execution times of an implementation of a code region; and 2) a statistical mechanism to determine which set of timings is fastest.

Referring now in specific detail to the drawings, and particularly FIG. 1, there is illustrated a simplified representation 100 of the implementation of a method M. Our implementation is composed of two main parts: 1) a dispatch mechanism 110 to select which version of code to run, and 2) a background thread 180 to process and analyze the timing data collected. The dispatch mechanism 110 selects N optimized versions (A-N) of the code region 120 to evaluate. The key idea is to select one of these implementations whenever the code region 120 is entered, and record the amount of time spent. For purposes of this discussion, we assume that there are two versions of the code being evaluated, and that optimization is performed at a method level.

The system 100 can generate two versions of the method M, optimized in different ways (call them version A and version B). When method M is invoked, a code sequence can randomly select whether to execute A or B. The time spent executing M is recorded by any means, such as using a fine granularity timer 160 that is started on entry to M, and stopped when M returns. These times are recorded in a buffer 130. As the program executes, timings for each implementation are collected for later analysis.

The buffer 130 is preferably a circular buffer 130 (preferably one buffer per thread in an application). An application thread that writes times into the buffer is referred to as a "producer thread". When it executes a stopping point, it records the time by writing into the buffer. The background processing thread 180 processes the method timings which have been collected in the circular buffer 130. The background processing thread 180 wakes up periodically and scans through each thread's buffer every 10 ms. The processing thread starts from the position in the buffer 130 where it left off last time, and scans the buffer 130 until it catches up with the producer thread. No synchronization is used, so race conditions are possible, but dropping a sample occasionally is not a concern. The system 100 is designed so that races cannot corrupt the data structures. Slots in the buffer 130 are zeroed after they are read to avoid reading a buffer 130 twice if the processing thread skips past the producer thread.

Figure 3:
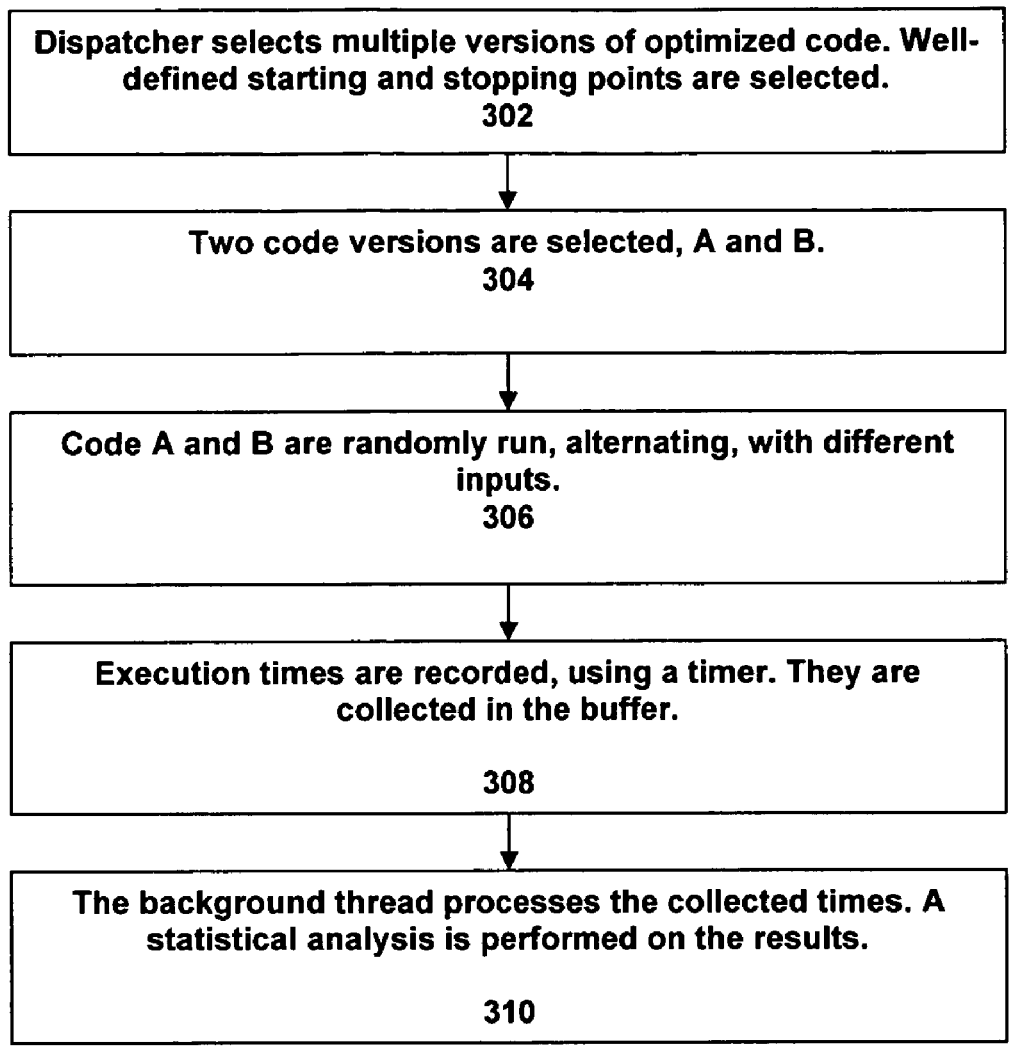
FIG. 3 is a flowchart of a method for evaluating code optimizations, according to an embodiment of the present invention.

Referring to FIG. 3, there is shown a flowchart of a process 300 according to an embodiment of the invention. In step 302 the process prepares multiple versions of optimized code 120. Each version 120 is optimized according to one or more parameter values. Well-defined starting and stopping points are identified, such as entry/exit of a method, or the beginning and ending of a transaction. In step 304 two of these code versions are selected for each set of trial runs. The system can generate two versions of the method M, optimized in different ways (version A and version B). When method M is invoked, a code sequence can randomly select whether to execute A or B.

Next, in step 306, the code versions 120 are randomly executed, alternating from code A to code B. Selecting A or B in a pseudo-random manner is important to ensure that there is no correlation of performance with program behavior. For efficiency, the technique can be optimized to avoid generating a random number on every execution of M. For example, it could generate a new random number every Nth invocation, then execute P invocations of A followed by P invocations of B. Pre-generation of pseudo-random numbers (possibly in the background) may be useful.

The execution times are recorded in step 308. The time spent executing M is recorded by any means, such as using a fine granularity timer 160 that is started on entry to M (or at another pre-selected starting point), and stopped when M returns (or at another pre-selected stopping point). These times are recorded in a buffer 130.

In step 310 the background thread 180 processes the execution times which were collected in the buffers 130 in order to make conclusions about the performance of each version, despite that none of the executions run with identical inputs. We use statistical analysis of the results. After a number of method timings for both A and B have been collected, statistical analyses such as standard hypothesis testing (such as t-test) can be used to establish the confidence, or probability, that one version is faster than the other. If a confident conclusion cannot be made one way or the other, more samples can be collected.

While processing the buffer 130, there are two primary tasks: 1) discard outliers, and 2) maintain a running average and standard deviation. Outliers cannot be identified by collecting and sorting the entire dataset because this would require too much space and time for an online system. Instead, the system 100 processes the data in smaller chunks of N samples, discarding outliers from this smaller set of times. The outliers are identified as the slowest M times in the chunk.

Maintaining the running average and standard deviation is a trivial task, performed by keeping a running total of the times, as well as the sum of the squares. Our system also requires that a minimum number of samples are collected (10,000) before confidence analysis is performed, to ensure that a small initial bias in the program sampling does not lead to incorrect conclusions. Once the sufficient number of data points is collected, a confidence function is invoked periodically to determine if the difference between the means is statistically meaningful. If a confident conclusion is reached, the contest ends and the winner is declared; otherwise, the contest continues. To ensure that a contest does not run indefinitely, the system can also end the contest after a fixed amount of wall clock time, or execution time, has expired.

The confidence function is necessary to overcome problems inherent in using code that executes with varying inputs and with changing program states. This implies that the different implementations of a code region could have taken different paths and operated on different data during their executions. For example, a particular execution of version A of the code region may run for less time than version B of the code region, not because A has a better implementation, but because an argument to the method M had a value that resulted in A performing less computations. For example, if the code region is a sorting algorithm, version A may have been invoked with a list of 10 elements, while version B was invoked with a list of 1,000 elements.

The confidence function overcomes this challenge by leveraging the law of large numbers. As the framework accumulates more timing samples for versions A and B, variations in timings will be evenly distributed across the two versions if the versions are selected randomly to avoid any correlation with the program's natural behavior. Given the timing data, the framework performs a statistical analysis and concludes which version is faster.

Deciding which version A or B is faster by averaging the timing samples for each version involves comparing the averages. Through comparison, the system 100 can determine which version is faster, but the comparison is meaningful only if there are enough timing samples. To determine if there are enough samples, we define a confidence metric, C that calculates the probability that the actual performance difference between versions A and B is consistent with the observed performance difference in the timing samples from versions A and B.

To calculate the confidence metric C, the mean and variance is computed for each set of timings. Then the absolute difference between the means [mean(A)−mean(B)], and the variance of the difference between the means $$\frac{variance(A)}{sizeof(A)} + \frac{variance(B)}{sizeof(B)}$$

is computed. This computed mean and variance define a normal probability distribution, and our confidence value is computed by integrating this distribution from 0 to ∞. We use the absolute difference between the means, which is always positive, so this confidence value is the probability that the difference between the means for the entire dataset is consistent with the difference between the means for our samples.

The number of samples needed before a conclusion can be made with confidence is directly correlated with the variance in the amount of work performed by the code region 120. If the code region 120 performs a constant amount of work on each invocation, a small number of samples will be needed to conclude that the performance difference is statistically significant. As the variance of the code region's running time increases, so does the number of samples needed before a confident conclusion can be made.

For this approach to succeed, we must ensure that our timings do not correlate with program behavior, because correlations can bias the timings for one version of the code region 120. If there are no correlations, we should be able to identify the performance differences among the versions after enough samples are collected.

Figure 2:
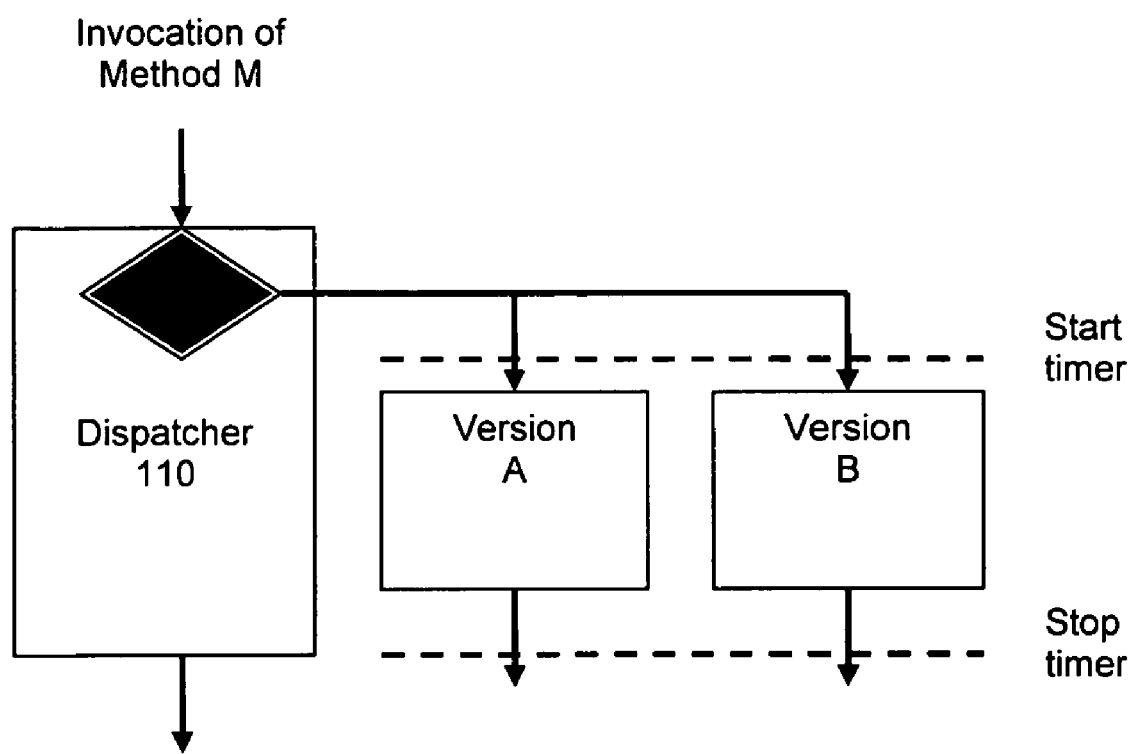
FIG. 2 is a high level block diagram showing dispatching method according to an embodiment of the present invention.

Assuming the code regions 120 for each performance contest are methods, we must intercept the method dispatch for the method being timed (M) so that execution can jump to an implementation at random. There are a number of ways this could be implemented in a VM. We chose to implement the dispatch as shown in FIG. 2, where a full method body is compiled to act as the dispatcher 110. The dispatcher method 200 is not timed, but contains a conditional test to decide whether a timed method should be executed, and if so, to invoke the correct one.

Compiling a full method body for the dispatcher 110 is not necessary, but doing so makes it easy to reduce the overhead of the timing instrumentation, because only a subset of the calls to M jump to one of the instrumented versions. In situations where compiling a third version of the method is not feasible, alternative implementations could exclude the method body from the dispatcher 110 so it always selects one of the timed methods. The dispatch logic could also be placed at the beginning of one of the timed methods, or inlined at the method's call sites.

Table 1 shows the dispatch method logic. The prologue checks a sampling condition to determine if any timed version should be executed. We use a count-down sampling mechanism, similar to Arnold and Ryder [7]. This makes the fast-path of the dispatcher method 200 reasonably efficient, containing only a decrement and check. Once the sample counter 135 reaches zero, it jumps to the bottom of the code to determine which timed version should be executed. This code is on the slow path and can afford to execute slightly more complicated logic.

TABLE 1

Dispatch Logic.

```
METHOD ENTRY:
    sampleCountdown --;
    if (sampleCountdown < 0) goto BOTTOM;
    ... body of method M ...
BOTTOM:
    if (sampleCountdown < (BURST_LENGTH * -1)) {
        // Burst completed. Toggle and reset count
        toggle = !toggle;
        sampleCountdown = SAMPLE_COUNT_RESET;
    }
    if (toggle)
        return invokeVersionA( );
    else
        return invokeVersionB( );
```

To minimize timing errors caused by caching effects from jumping to a cold method, the dispatcher 110 invokes the timed methods in consecutive bursts. Once the burst threshold (BURST_LENGTH) number of invocations of the timed method has occurred (tracked by letting the sample counter go negative) the sample counter 135 is reset. A toggle flag is maintained to toggle between optimization versions A and B. If more than two versions are being compared, this toggle can easily be replaced by a switch statement. All of the counters are thread-specific to avoid race conditions and ensure scalable access for multi-threaded applications.

If a pure counter-based sampling mechanism is used, it could correlate with program behavior, and even a slight correlation could skew the timing results. One solution would be to randomly set a toggle flag on each invocation. Instead we vary the sample counter 135 and burst length by periodically adding a randomly selected epsilon. In our system we use the VM sampling thread to update these quantities every 10 ms, and this is sufficient to avoid deterministic correlations.

The number of samples needed to make a confident conclusion depends on the variance of the timings; thus, reducing variance will reduce the time needed to make a conclusion. Another mechanism to reduce the timing variance is to time finer granularity events. In the case of a virtual machine and JIT (just in time) compiler, we could time acyclic paths rather than method execution time. Acyclic paths do not have loops, thus the variance is several orders of magnitude less.

Acyclic paths could be timed directly, but this requires infrastructure that may introduce overhead. An average acyclic path time can be computed by placing a counter on loop back edges and method entry, and dividing the method execution time by this counter. Many VM's insert yieldpoints, or async checks, at these locations, thus we can insert counters with these checks. Another way to describe this approach is that we are recording both the method's running time as well as relevant characteristics of the method's execution, and using this information to make a more accurate comparison.

The counter 135 also needs to be placed on all methods called by M. To reduce overhead, the counters can be compiled into all methods, but conditionally executed. The condition is enabled when method M is entered, and disabled when M is exited. The condition can be made efficient by combining it with the yieldpoint checks (similar to the technique use in Arnold-Grove CGO'05). The yieldpoint counter may also need to be placed on any high-variance loops executed by the VM, such as array copy or array zeroing (initialization).

Another option for reducing variance is to eliminate as much noise as possible. One solution is to exclude outliers in the timing data, but this had the down side of possibly throwing out legitimate data. Other approaches include identifying sources of noise and eliminating them, such as throwing out timings that were polluted by system events such as compilation or garbage collection. Some operating systems support the ability to stop and start the timer if the operating system thread sleeps.

To further reduce noise, the timer 135 can be stopped during events that are not interesting to the performance evaluating. For example, when evaluating the performance of method M, the timer can be stopped during the execution of methods called by M.

There are three primary sources of overhead for our technique: 1) executing the sampling condition on the fast path of the dispatcher 110, 2) reading and storing the processor's cycle counter at method entry and exit, and 3) processing the timing samples with the background thread 180. This overhead is for the infrastructure itself, and is independent of the optimizations being compared. To quantify the overhead, the online system was configured so that it constantly performs a contest. Our online system will perform one contest at a time, so we evaluate the overhead for each of the hot methods in our data set independently.

Figure 4:
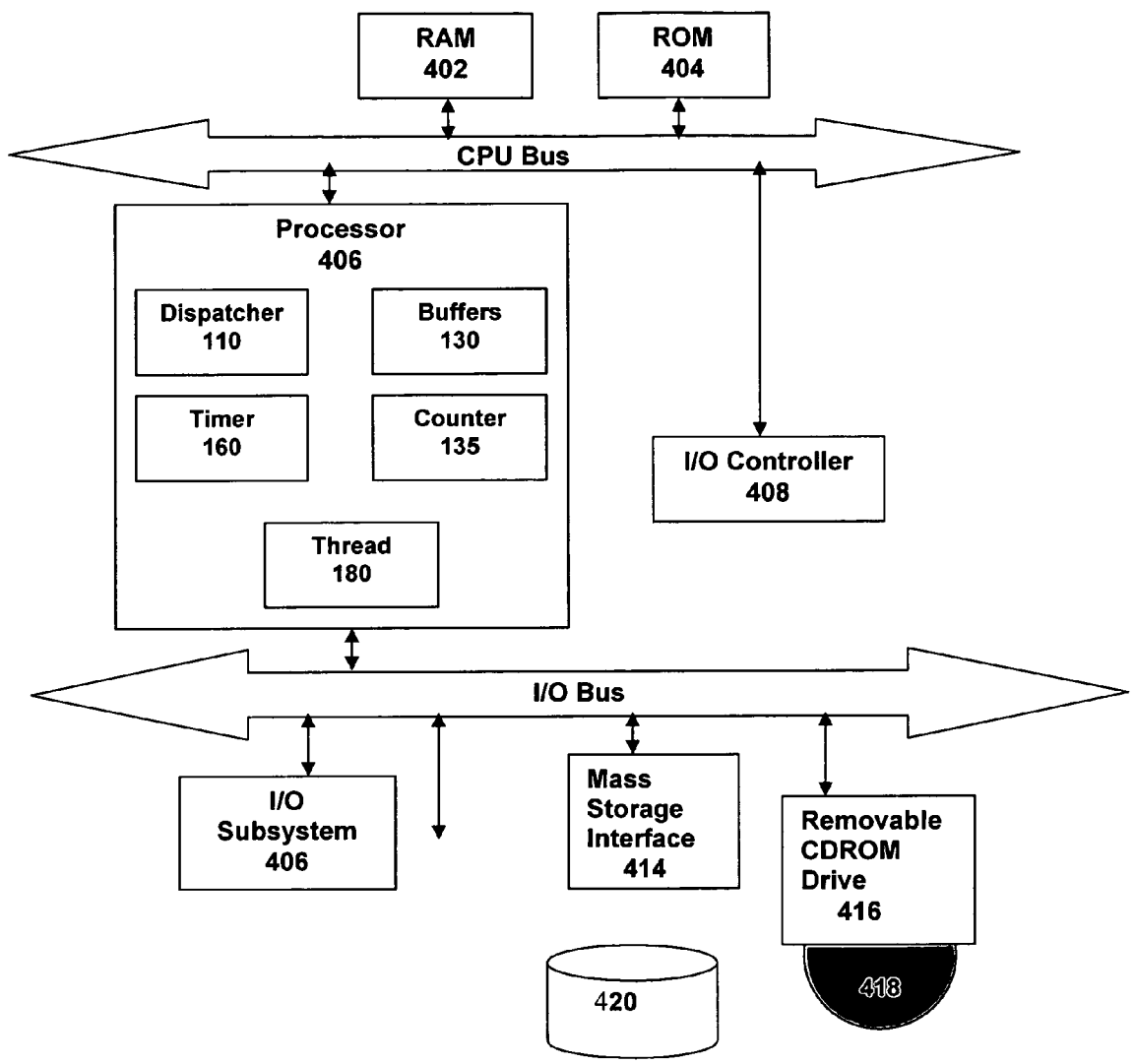
FIG. 4 is a high level block diagram of a computer system configured to operate according to an embodiment of the present invention.

Referring to FIG. 4, there is shown a high-level block diagram of an information handling system 400 configured to operated according to an embodiment of the present invention. The system 400 comprises a processor 402, a memory 404, and an input/output (I/O) subsystem 406. The processor 402 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors maybe implemented in an ASIC. RAM may be embodied in one or more memory chips. The memory may be partitioned or otherwise mapped to reflect the boundaries of the various memory subcomponents. The processor 402 as depicted here includes the following components: a dispatcher 110, buffers 130, timers 160, background thread 180, and counters 135.

The memory 404 represents either a random-access memory or mass storage. It can be volatile or non-volatile. The system 400 can also comprise a magnetic media mass storage device such as a hard disk drive. A mass storage interface 414 may be included, as well as mass storage 420. An I/O subsystem 406 may comprise various end user interfaces such as a display, a keyboards, and a mouse. The I/O subsystem 406 may further comprise a connection to a network such as a local-area network (LAN) or wide-area network (WAN) such as the Internet. Processor and memory components are physically interconnected using conventional bus architecture.

According to an embodiment of the invention, a computer readable medium, such as a CD/DVD ROM 418, can include program instructions for operating the programmable computer 400 according to the invention. The CD/DVD ROM 418 operates via a removable CDROM drive 416. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention.

We claim:

1. A method for evaluating software performance, the method comprising steps of:
receiving a plurality of code versions;
selecting starting and stopping points for timing execution of the code versions, the selecting step comprising: designating an entry to the code as the starting point; and designating an exit from the code as the stopping point;
dispatching at least two of the plurality of code versions for execution;
repeatedly executing the at least two code versions;
recording execution times for the at least two code versions, according to the selected starting and stopping points; and
using a background thread to:
process the recorded execution times for comparison purposes;
discard outliers;
maintain a running average and standard deviation for each code version; and
perform a statistical analysis of the collected execution times for determining which code version is fastest;
wherein the background thread is activated periodically and when activated, scans through each buffer, collecting the execution times.

2. The method of claim 1 further comprising collecting the execution times in a buffer.

3. The method of claim 1 further comprising recording the execution times using a fine granularity timer.

4. The method of claim 1 wherein method boundaries are used to delimit the code versions.

5. The method of claim 1 wherein the dispatching step comprises randomly selecting which code version to execute.

6. The method of claim 1 further comprising steps of:
invoking a confidence metric periodically to determine if a difference between means is statistically significant, wherein the confidence metric is determined by steps of:
computing a mean and variance for each set of execution times;
calculating an absolute difference between the mean of each set of execution times; and
calculating a variance of a difference between the means.

7. The method of claim 5 wherein the dispatching step further comprises steps of:
invoking the code versions in consecutive bursts until a burst threshold is reached;
resetting a sample counter; and
toggling between code versions.

8. The method of claim 1 wherein the code is an acyclic path.

9. The method of claim 1 wherein the method steps are performed online.

10. The method of claim 1 wherein the following steps are performed online: dispatching, repeatedly executing, recording, collecting, and processing.

11. A system for evaluating performance of code, the system comprising:
   a processor configured for executing computer program instructions, said computer program instructions, when executed, enabling the processor to:
   receive a plurality of code versions;
   select starting and stopping points for timing execution of the code versions;
   dispatch at least two of the plurality of code versions for execution;
   repeatedly execute the at least two code versions;
   record execution times for the at least two code versions, according to the selected starting and stopping points;
   use a background thread to:
      collect the execution times;
      process the collected execution times for comparison purposes;
      discard outliers;
      maintain a running average and standard deviation for each code version; and
      perform a statistical analysis of the collected execution times for determining which code version is fastest;
      wherein the background thread is activated periodically and when activated, scans through each buffer, collecting the execution times;
   a memory for storing the execution times; and
   an input/output interface for communicating results to a user of the system.

12. The system of claim 11 further comprising:
   thread-specific counters for tracking iterations of the code; and
   timers for timing the execution of the code.

13. The system of claim 11 wherein the memory comprises circular buffers.

14. The system of claim 13 wherein the code is optimized virtual machine code.

15. A computer readable medium comprising program instructions for:
   receiving a plurality of code versions;
   selecting starting and stopping points for timing execution of the code versions, wherein the selecting step comprises designating an entry to the code as the starting point; and
   designating an exit from the code as the stopping point;
   dispatching at least two of the plurality of code versions for execution;
   repeatedly executing the at least two code versions;
   recording execution times for the at least two code versions, according to the selected starting and stopping points; and
   using a background thread to:
      process the recorded execution times for comparison purposes;
      discard outliers;
      maintain a running average and standard deviation for each code version; and
      perform a statistical analysis of the collected execution times for determining which code version is fastest;
      wherein the background thread is activated periodically and when activated, scans through each buffer, collecting the execution times.

16. The computer readable medium of claim 15 further comprising a step of collecting the execution times in a buffer.

* * * * *